Nov. 8, 1960  J. BIALY  2,959,082
STRAIN GAGE TRIMMER
Filed Sept. 24, 1956

INVENTOR
JOSEPH BIALY
BY
ATTORNEY

United States Patent Office 2,959,082
Patented Nov. 8, 1960

2,959,082

STRAIN GAGE TRIMMER

Joseph Bialy, 14 Markus Drive, Buffalo 25, N.Y.

Filed Sept. 24, 1956, Ser. No. 611,688

4 Claims. (Cl. 83—561)

This invention relates to a strain gage trimmer.

Strain gages of the bonded filament type have their electrical resistance filament, usually in grid form, bonded to a carrying membrane of thin paper, Bakelite, or other suitable material and when the gage is placed in use this membrane is cemented to a test member. It is desirable to have such membrane trimmed with true and parallel sides and as close as possible to the filament strands, thereby to facilitate a more accurate grid location on a member or specimen under test with consequent greater accuracy in force measurement. It is also desirable to eliminate any excess portion of the membrane so as to minimize the amount of cement beneath the gage membrane thereby facilitating more rapid drying and greater accuracy of response. Heretofore when an exacting application of the gage was encountered it has been necessary to use scissors to trim the excess portion of the membrane but the use of scissors made it difficult to cut parallel sides on the gage and there was the constant danger of damaging the grid filament.

It is an object of my invention to provide an improved apparatus for effectively and expeditiously trimming a bonded filament type strain gage.

Another object is to provide an improved strain gage trimmer that will insure accurate parallel sides disposed close to the gage filament without danger of damaging the filament.

A further object is to provide an improved strain gage trimming apparatus that can be readily and easily adjusted to trim gages for various widths with a high degree of accuracy.

A still further object is to provide an improved strain gage trimmer that will permit the gage to be effectively centered with the grid properly positioned parallel to the cutters, and then hold and cut, all with minimum effort by the operator. It is also an object to allow trimming either of a single edge or dual trimming of the two edges of a gage.

Other objects and advantages will be more apparent to those skilled in the art from the following description of the accompanying drawings in which.

Figures 1, 2, 3, 4, 5, 6:
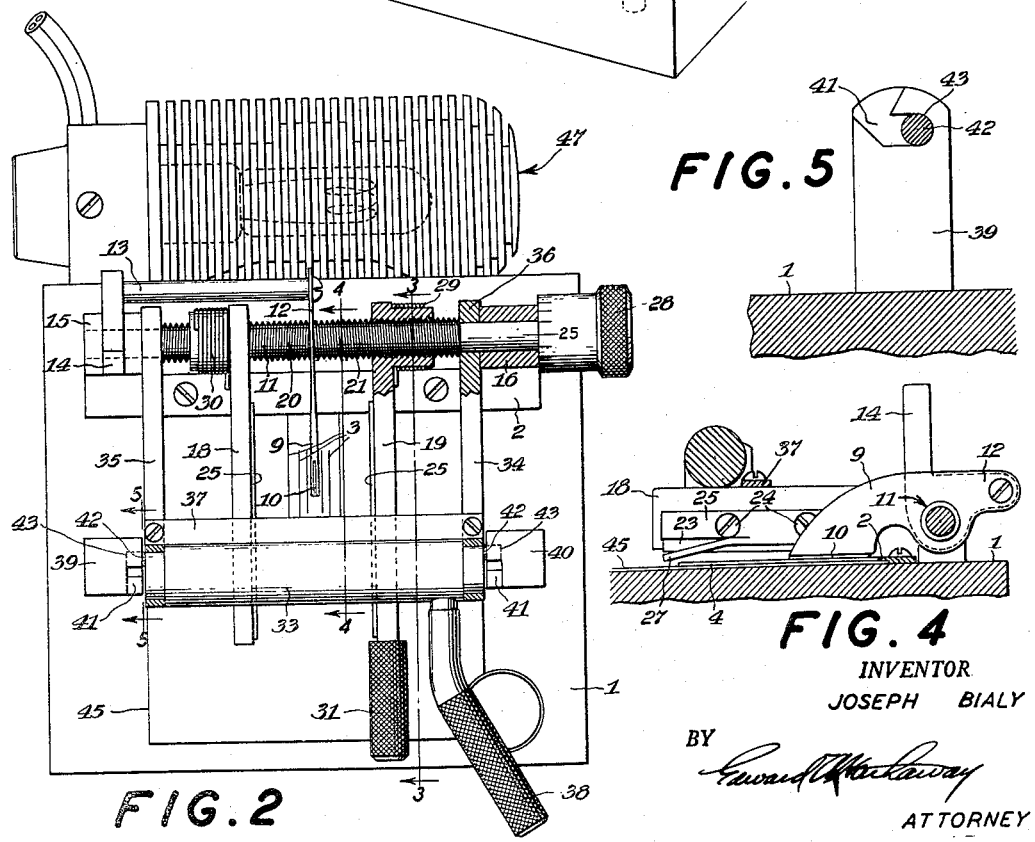
Fig. 1 is a perspective of my improved gage trimmer shown in its open position.
Fig. 2 is a plan view of a trimmer with parts broken away to show details of construction.
Fig. 3 is a section taken on the line 3—3 of Fig. 2.
Fig. 4 is a section taken on the line 4—4 of Fig. 2.
Fig. 5 is a section taken on the line 5—5 of Fig. 2 to show the pressure applying post-construction.
Fig. 6 is a perspective diagrammatically illustrating a bonded filament type strain gage.

In the particular embodiment of the invention disclosed herein for purposes of illustration I provide a base 1 preferably of translucent material such as "Lucite" or the like, having a gage aligning strip 2 mounted thereon. A series of sets of parallel lines 3, scribed on the top surface of the base 1 at right angles to the front edge of the aligning strip 2, are spaced apart various distances from the center of the device depending upon the width to which it is desired to trim the gages. These various spacings are indicated, for purposes of illustration, as ⅛" (125), ¼" (250), and ⅜" (375). Any other widths desired may be also scribed. A well known bonded filament type strain gage, generally indicated at 4, has a grid formed of parallel strands of an electrical resistance filament 5 mounted on a thin membrane 6 which is usually translucent. The gage may be placed in the position shown by the dotted lines 7 with the end of the gage against the aligning strip 2 although if the end of the gage is not square with the lengthwise axis of the filament then the gage may be placed so that its filaments are parallel to a given set of lines 3 and suitably centered with respect thereto. Some gages have a center line 8 marked thereon in which case it may be used for centering the gage by being placed in a position 7, Fig. 1, beneath the edge of a holding down finger 9. Such edge is a thin rubber strip 10 held in the finger 9 so as to not damage the gage when holding down pressure is applied. This finger is journalled on the center of an adjusting screw shaft 11 and is rigidly connected at its overhanging rear end 12 by a rod 13 to a small bell crank lever 14. This bell crank in turn is freely pivotally supported on an extension of the screw shaft 11 which is journalled in a pair of bearing brackets 15 and 16. When the lever 14 is swung rearwardly the finger 9 is lifted and may be held in either its open or clamping position by a suitable ball and detents located between the bell crank hub and bracket 15.

To trim the gage membrane I provide a pair of knife carrying members 18 and 19 threadedly supported on right and left hand screws 20 and 21 of the shaft 11. These two sets of threads meet near the finger 9 and are slightly separated at this juncture to provide a cylindrical bearing surface on the shaft for the finger. Each knife structure has removable cutting blades 22 and 23 held by screws such as 24. Each blade has a plate 25 also held by these screws, the outer ends of the plates being split to provide yieldable releasing fingers 27. The spacing between the cutting blades may be adjusted by rotation of a suitably graduated knurled knob 28 secured to shaft 11. The graduations on the knob hub may be in thousandths of an inch so as to correspond with the spacings between the centering lines 3. Rotation of the handle 28 in one direction or the other will cause the right and left hand threads to move the cutting blades toward or away from each other. These blades are biased to their upper open position, shown in Fig. 1, by coil springs 29 and 30 encircling the threaded hubs of the knife elements.

The knife element 19 may be used for a single cutting operation merely by swinging its handle 31 downwardly. However, if it is desired to simultaneously operate both knife blades then a cylindrical crossrod 33 commonly engaging both blade structures is employed. This is journalled in a pair of arm 34 and 35 which in turn are pivotally supported on shaft 11 in the manner shown at 36, Fig. 2. These arms are rigidly connected together at their upper ends by a cross piece 37. The crossrod 33 has an operating handle 38 which is adapted to swing the crossrod and knife elements downwardly on top of the gage and simultaneously, through suitable cooperative means, to lock the crossrod in its down position and apply cutting pressure. This locking and pressure applying operation is accomplished by the provision of a pair of heads 39 and 40 secured to the base and each of which has a generally L-shaped slot 41 with one end open upwardly to receive pins 42 mounted eccentrically on each end of the crossrod 33. The eccentric pins upon entering the L-shaped slots and being rotated toward the closed ends 43 of the slots will first hold the knives in position and then cause considerable downward pressure on the knife elements by reason of the eccentric pins 42 being held against vertical movement by the closed end of the slots as the crossrod continues to be rotated, thereby forcing the crossrod and knives downwardly. The gage membrane will thus be trimmed whereupon handle 38 will be reversely rotated to release eccentric pins 42 so that springs 29 and 30 will rotate the entire cutting structure to its open position. Thereupon bell crank lever 14 may be moved rearwardly to lift finger 9. During the cutting operation the cutting blades tend to adhere to the membrane and the force of the springs 29 and 30 is not great enough to release the blades from the membrane. The function of the yieldable fingers 27 is to assist in such releasing action, it being understood that the fingers are flexed when pressed down on the gage during the cutting operation thereby providing a holding down releasing force during subsequent lifting of the blades. A thin transparent sheet of material 45 may be placed on top of the base 1 and held beneath aligning strip 2 to provide a replaceable cutting surface.

Because the base 1 is of "Lucite," or other transparent material, it can be easily illuminated by placing a lamp unit 47 on the rear edge of the base thereby to facilitate positioning of the gage on the indexing lines 3.

From the foregoing disclosure it is seen that I have provided a highly effective strain gage trimming apparatus that permits the gage membrane to be trimmed very close to the gage filaments with minimum possibility of damage to the gage and with both sides true and parallel. The operation can be performed very quickly, easily, and with a great deal of precision with minimum effort on the part of the operator. Such functions are especially useful where strain gages are used by the thousands. In addition, the device is compact, rugged and yet relatively simple and easy to manipulate for a precision instrument of this type.

It will, of course, be understood that various changes in details of construction and arrangement of parts may be made by those skilled in the art without departing from the spirit of the invention as set forth in the appended claims.

I claim:

1. Apparatus for trimming the membrane upon which a strain gage filament is bonded comprising, in combination, a base having a stationary surface upon which a strain gage is placed, a shaft having right and left hand screw threads, means for rotatably supporting said shaft by said base, a pair of parallel elongated knives respectively threadedly supported on said right and left hand threads so as to be pivotally movable down on to said surface to trim the membrane of a strain gage placed on the surface, and means for rotatably adjusting said shaft so as to move the blades relative to said stationary surface and toward or away from each other to vary their spacing for trimming gages of different widths while maintaining a common centering position on said stationary surface for gages of all widths.

2. The combination set forth in claim 1 further characterized by the provision of a finger pivotally supported on said shaft between the adjacent ends of the right and left hand threads and between the knives, and means extending to a point laterally of the outside of one of said knives for pivotally moving said finger downwardly for holding the gage on said surface.

3. The combination set forth in claim 1 further characterized by the provision of means for simultaneously engaging said knives to move the same downwardly toward the base, and eccentric means for exerting a cutting pressure on the knives when they are in engagement with a gage membrane, said eccentric means having provision for being operative only after the knives have moved downwardly to near the gage supporting surface.

4. Apparatus for trimming the membrane upon which a strain gage filament is bonded comprising, in combination, a base having a surface upon which a strain gage is placed, a pair of parallel knives, means for supporting the knives so that they overlie said surface and are movable downwardly onto such surface to trim the membrane of a gage by a direct compression action between the surface and knives, pivotal arms located on the outside of said knives, a rotatable crossrod journalled in said arms and engageable simultaneously with said knives to move the latter downwardly upon downward movement of the pivotal arms, eccentric pins mounted on the ends of said rotatable rod, and means carried by said base and engageable with said eccentric pins when the knives are moved to their cutting position whereby upon rotation of the crossbar the eccentric pins cause a cutting pressure to be applied to the knives.

References Cited in the file of this patent
UNITED STATES PATENTS

| Number | Name | Date |
|---|---|---|
| 120,634 | Everitt et al. | Nov. 7, 1871 |
| 354,641 | Lash | Dec. 21, 1886 |
| 530,780 | Kingsbury | Dec. 11, 1894 |
| 1,381,814 | Farkas | June 14, 1921 |
| 1,398,202 | Scarborough | Nov. 22, 1921 |
| 1,435,315 | La Vigne | Nov. 14, 1922 |
| 1,972,536 | Rohrdanz | Sept. 4, 1934 |
| 2,279,078 | Swanson | Apr. 7, 1942 |
| 2,378,249 | Ruth | June 12, 1945 |
| 2,667,923 | Tilden | Feb. 2, 1954 |
| 2,764,240 | White et al. | Sept. 25, 1956 |